United States Patent [19]
Modoux

[11] Patent Number: 5,253,573
[45] Date of Patent: Oct. 19, 1993

[54] SAFETY DEVICE FOR LIMITING THE AXIAL LOAD EXERTED ON A DRIVE WORM

[75] Inventor: Joseph Modoux, Echallens, Switzerland

[73] Assignee: Bobst SA, Switzerland

[21] Appl. No.: 680,054

[22] Filed: Apr. 3, 1991

[30] Foreign Application Priority Data

Apr. 3, 1990 [CH] Switzerland ............ 01113/90

[51] Int. Cl.[5] .......................................... B30B 15/28
[52] U.S. Cl. ..................................... 100/53; 74/89.14;
74/412 TA; 83/543; 100/286; 192/56 R;
192/150; 464/30
[58] Field of Search ............... 100/53, 281, 286;
74/89.14, 412, 412 TA, 425; 83/543, 630;
192/56 R, 56 F, 85 AA, 150; 464/26, 30

[56] References Cited

U.S. PATENT DOCUMENTS

| | | | |
|---|---|---|---|
| 902,527 | 10/1908 | French | 192/56 R |
| 2,467,426 | 4/1949 | Cuttat | 192/56 R |
| 2,642,971 | 6/1953 | Hagenbook | 464/26 X |
| 2,702,619 | 2/1955 | Andershock | 464/26 X |
| 2,793,630 | 5/1957 | Halik | 192/150 X |
| 2,864,305 | 12/1958 | Golding | 100/53 X |
| 3,380,264 | 4/1968 | Moore | 192/56 R X |
| 3,807,539 | 4/1974 | Reed | 192/56 F X |
| 4,003,219 | 1/1977 | Stull | 464/26 |
| 4,023,430 | 5/1977 | Imamura | 192/150 X |
| 4,542,814 | 9/1985 | Ledeen et al. | 74/425 X |

FOREIGN PATENT DOCUMENTS

| | | |
|---|---|---|
| 500312 | 3/1920 | France ............ 464/26 |
| 1337828 | 12/1963 | France . |
| 955055 | 4/1964 | United Kingdom . |

*Primary Examiner*—Stephen F. Gerrity
*Attorney, Agent, or Firm*—Hill, Steadman & Simpson

[57] ABSTRACT

A safety device for limiting axial operating loads which are exerted on a drive worm of a machine, such as a platen press, including a pressure chamber receiving a first piston connected to an auxiliary shaft, which is axially shiftable and non-rotatable, and is connected to one end of a main shaft of the drive worm. Fluid pressure in the pressure chamber holds the piston in a first position to maintain the axially displaceable connection of the other end of the main shaft to a drive shaft. In response to an axial overload, the pressure in the pressure chamber is relieved to eliminate the holding feature to allow the main shaft to shift axially to disengage it from the drive shaft. The safety device includes a second piston for moving the first piston to the first position where the drive shaft and main shaft are recoupled when the machine is in a rest position.

14 Claims, 2 Drawing Sheets

SAFETY DEVICE FOR LIMITING THE AXIAL LOAD EXERTED ON A DRIVE WORM

BACKGROUND OF THE INVENTION

The present invention is directed to a safety device which is designed for controlling or limiting within a machine the axial operating load exerted on a drive worm, wherein the drive worm is mounted on a rotary main shaft having one end which is provided with a connecting means for connecting the shaft to a drive shaft, said main shafting having a second end being coupled to the safety device by a non-rotatable auxiliary shaft wherein the safety device allows an axial shifting of the drive worm to cause an uncoupling of the first end from the drive shaft in response to an excess torque being applied to the worm.

Cutting presses, such as illustrated in FIG. 1, are known to be provided with safety devices. The press in FIG. 1 includes a frame Ba that consists of lateral stays or frame members H, an upper crossbar of frame member Ts and a lower crossbar or frame member Ti. An upper fixed beam or platen Ss is mounted on the upper crossbar Ts and a lower movable beam or platen Si is provided within the frame. A sheet F of material, such as pasteboard or cardboard, which is to be cut by cutting rules Fi of a tool O fitted on the upper beam or platen Ss is to be carried between the two platens Si and Ss by a gripper bar Bp, which is carried by a pair of chains (not illustrated). In the course of the cutting process, the lower beam Si is moved by an assembly consisting of a drive worm 1, a gear R engaging the worm 1, a crankshaft Vi and toggle levers G. With rotation, the crankshaft Vi moves from a lower dead center position, as illustrated, to an upper dead center position and back. The drive worm 1 is driven by a motor M. The connection between the motor M and the drive worm 1 is achieved by means of a drive belt C, a brake and clutch assembly E, a flywheel Vo and a safety clutch or connecting means consisting of a toothed rim 30 mounted in a toothed socket of a shaft 5 of a flywheel Vo and a toothed part 10 which is arranged on a first end 12' of a main shaft 12 of the drive worm 1. The shaft 12 is fitted so as to be rotated freely and shifted lengthwise in the frame Ba of the machine. At the second end 12", the shaft 12 has a safety device S', which acts to limit the axial load on the shaft 12 and consists of a non-rotary shaft end 4 connected by a clutch support 11 to the shaft 12 of the drive worm 1. This end of the shaft 4 is held in place by a tapering lock S1 engaged with a corresponding groove S3, which are located on the same end of the shaft 4. The locks S1 are pushed toward the groove S3 by springs S2. As soon as the torque exerted on the drive worm 1 becomes too strong under the effect of an axial pushing force resulting therefrom, the drive worm 1 will undergo a shift and, thereby, push the ends of the shaft 4 toward the lock S1, which then move apart by compressing the springs S2. With a certain amplitude of the axial force exerted, the locks will now cease to be engaged with the end of the shaft 4 so that the toothed part 10 on the first end 12' of the shaft 12, will slip out of the toothed rim 30 of the shaft 5 to disconnect the shaft 5 from the shaft 12.

The safety device mentioned above is necessary in a sheet processing press to compensate for problems caused by the following:

a jam-up, which might happen somewhere within the press and cause a displacement of the chain pair carrying the gripper bars Bp through the press. This will involve the risk that the bar Bp will become caught between the two platens Si and Ss when the toggle lever G and the crankshaft Vi reach the upper dead center position;

some matter or tool might have been left between the two beams of platens Si and Ss after mounting the tool O or its counterpart (not represented);

two sheets F might be simultaneously carried into the machine by accident; and for an unknown reason, an excessive force might build up and exert a high torque on the drive worm 1. Such an occurrence is possible with a high number of blanks to be cut simultaneously involving too high a processing force.

U.S. Pat. Nos. 902,527 and 2,467,426, along with French Patent 1 337 828 all disclose other examples of known safety devices which allow for controlling the axial loading on a drive worm.

The devices known up to now for controlling the axial load exerted on a drive worm do meet the required safety conditions properly speaking, for instance, in the case of cutting presses, the safety device S' allows a sufficiently safe and quick disengagement of the drive worm 1 from the drive system of the flywheel Vo and the motor M when an axial overload occurs. However, these devices have a drawback in the event that they will have to be put back into operating position or reset after the axial overload has been removed. This resetting results in a long machine down-time, which may last for one or two hours. Since it is desired to increase the production speed of a machine to its maximum, an interruption of this duration is no longer permissible or desirable.

SUMMARY OF THE INVENTION

The object of the present invention is to provide a safety device for controlling the axial load on a drive worm which device would require only a minimum amount of down-time for resetting or putting the device back into its operating position after an overload situation has been removed.

To accomplish these goals, the present invention is directed to an improvement in a safety device for limiting an axial operating load exerted on a drive worm for a machine, said device including a drive worm being mounted on a rotatable main shaft having a first end provided with connecting means for connection to a drive shaft, said main shaft having a second end being coupled to the safety device by an axially shiftable, non-rotatable auxiliary shaft so that the connecting means between the main shaft and the drive shaft can be disengaged by an axial shifting of the main shaft, and the non-rotatable auxiliary shaft in a first direction in response to a release by the safety device. These improvements include the safety device having a housing containing a holding chamber provided with a pressurized oil inlet, said auxiliary shaft extending into the holding chamber and having a holding piston formed thereon, said piston being provided with a first surface on which the pressurized oil acts so as to hold the drive worm steady by exerting a force directed contrary to the first direction and the axial loading force and with a second surface of the piston engaging an end wall or engagement surface of the holding chamber in such a way as to limit the amount of shifting of the drive worm in a second direction resulting from the action of the oil pressure exerted on the first surface of the piston, at least one passage for allowing a free flow of oil in the chamber from a side of the chamber of the first surface of the piston to the side of the chamber with the second surface of the piston and pressure responsive or relief means for enabling a slight discharge of oil from the chamber in response to an excess force being applied by an axial overload so as to enable the shifting of the piston in the first direction opposite to the second direction resulting from the oil exerted on the first surface so that pressure will then act on two sides of the piston and, thus, eliminate its holding task.

Other advantages and features of the invention will be readily apparent from the following description of the preferred embodiments, the drawings and claims.

BRIEF DESCRIPTION OF THE DRAWINGS

FIG. 3 representing the safety device when the drive worm is in an operating position; and FIG. 4 representing the safety device after it has allowed the disconnection of the worm's shaft from the main drive shaft.

DESCRIPTION OF THE PREFERRED EMBODIMENTS

Figure 2:
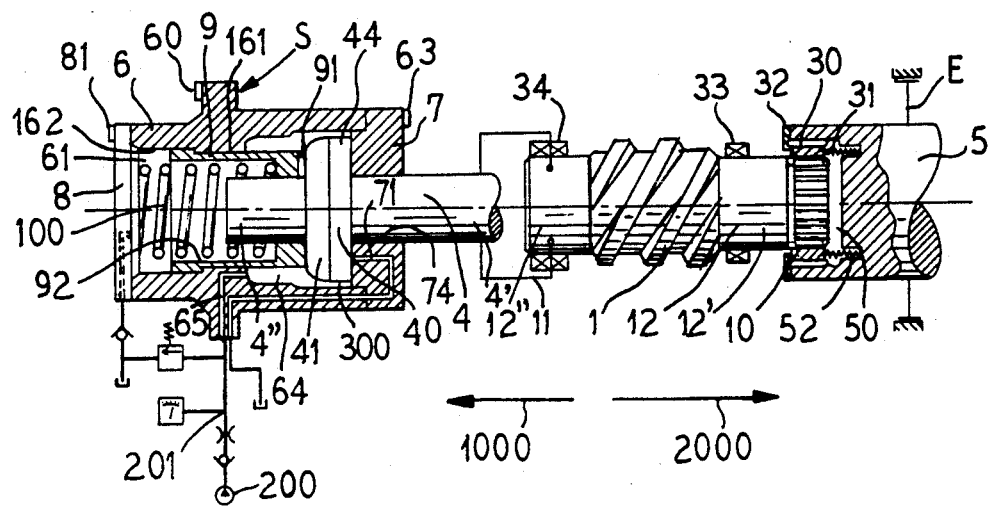
FIGS. 2, 3 and 4 are cross sectional views of the safety controlled device according to the present invention illustrating the safety control device in three different conditions, with FIG. 2 representing the control device when the drive worm is in the rest position.
Figure 3:
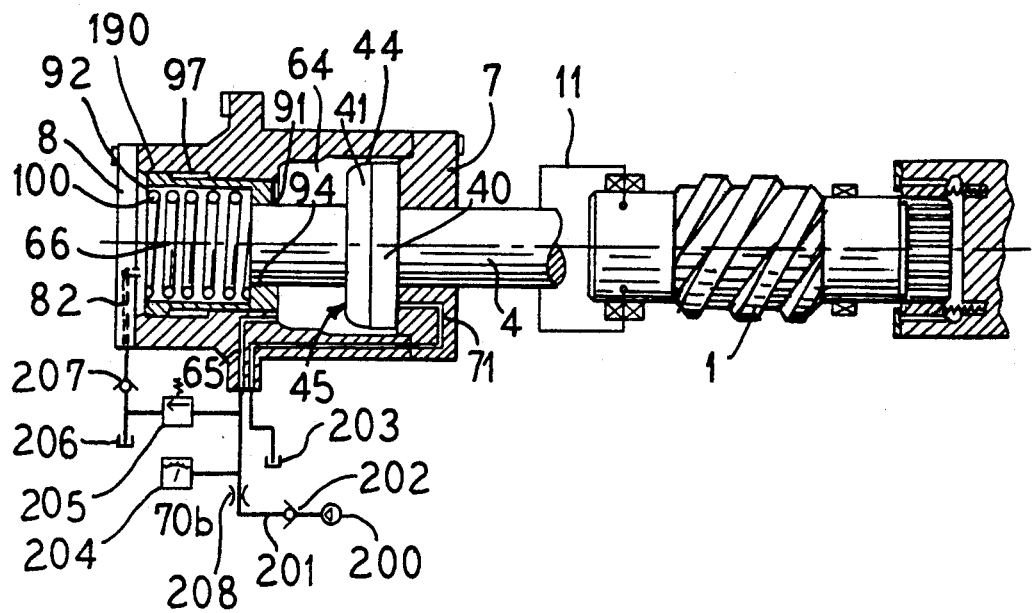
Figure 4:
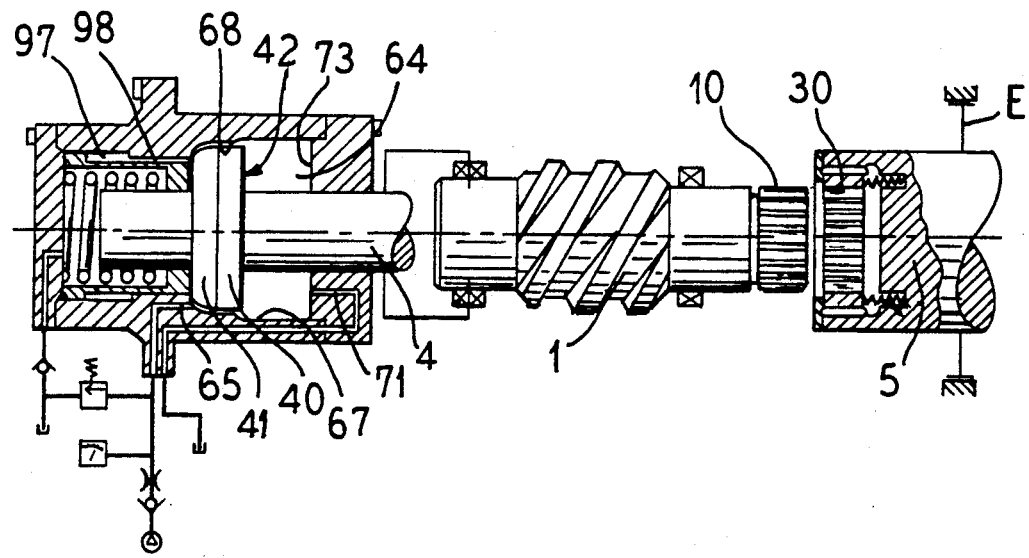

The principles of the present invention are particularly useful when incorporated in a safety device S, which is illustrated in FIGS. 2, 3 and 4.

Figure 1:
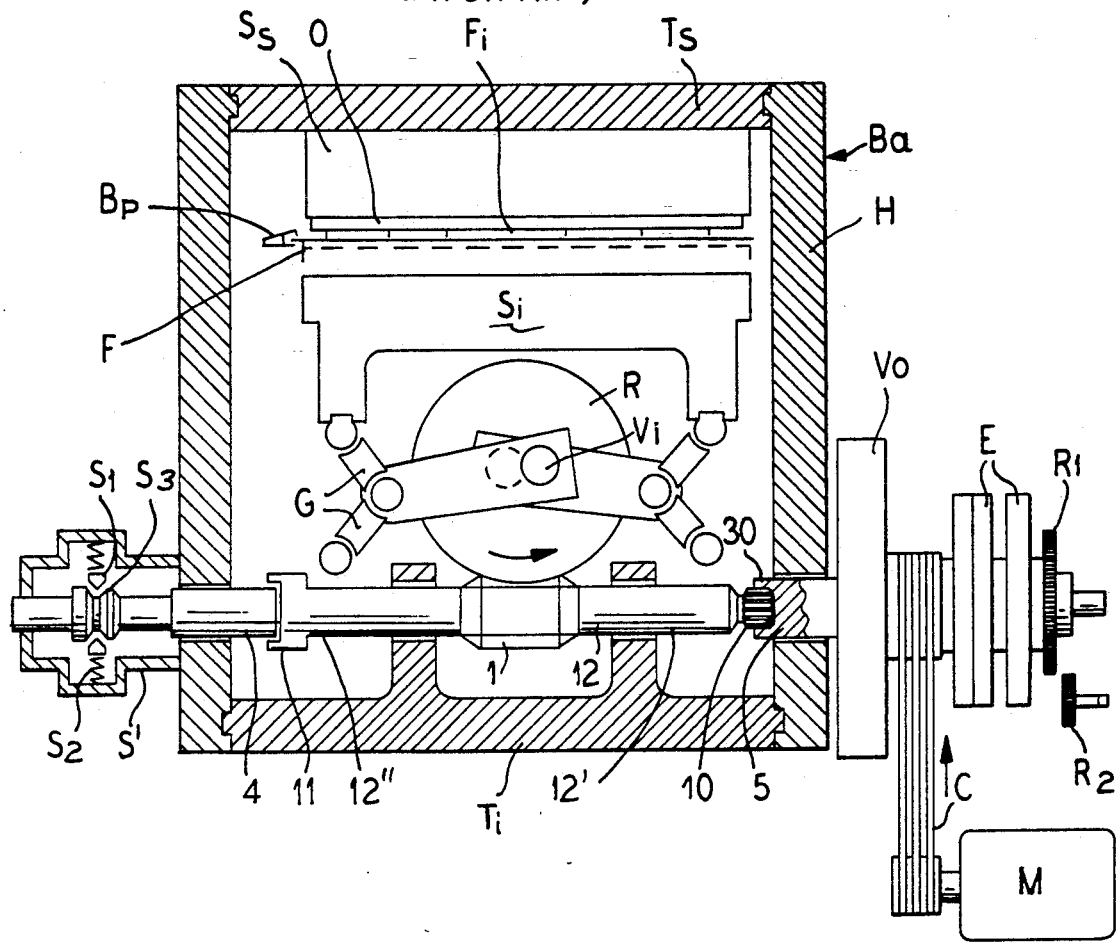
FIG. 1 is a schematic representation of a sheet die-cutting press provided with a safety device, in accordance with the prior art.

In FIGS. 2, 3 and 4, the drive worm 1 is the same kind as described above in the prior art device of FIG. 1. For this reason, the reference symbols used in FIG. 1 for the parts of FIGS. 2 and 4 will correspond to those represented in FIG. 1. Attention is drawn to the fact that the motor M, the belt C, the flywheel Vo and the gearwheels R1 and R2 (the latter being foreseen for driving other elements than those of the press) that were shown in FIG. 1 have been omitted from FIGS. 2-4, since they are not compulsory items for understanding the present invention.

As illustrated in FIG. 2, the first end 12' of the shaft 12 of the drive worm 1 is mounted in the frame of the machine for rotation by a ball bearing 33. The first end 12' terminates in the shape of a toothed pinion 10, which will engage into the inner teeth of a ring or rim 30 which has outer teeth which are engaged in the corresponding teeth of an inner periphery of a bore 50 on a drive shaft 5, which is connected to a clutch and brake assembly E. A washer or annular retainer 32 is mounted on the end of the shaft 5 and prevents the toothed rim 30 from slipping out of the bore 50. In addition, compression springs 31, which are present in bores 52, urge the toothed rim 30 against the washer or retainer 32, but allow it to be shifted axially within the bore 50.

The second end 12" of the shaft 12 of the worm gear 1 is mounted for free rotation within a bearing 34 and is arranged with a coupling support 11 that is capable of being shifted parallel to the axis of the drive worm 1. The coupling support 11 has the purpose for connecting the second end 12" of the shaft 12 of the drive worm 1 to a first end 4' of a non-rotating auxiliary shaft 4. This connection is achieved in such a way as to enable simultaneous, lengthwise or axial shifting of the two shafts 1 and 4, though no axial shifting of one shaft relative to the other. To this aim, the coupling support 11 and the bearing 33, which may be a ball bearing, are mounted for lengthwise shifting within a machine, for example, within a sliding groove on a lower crossbar or member Ti of the cutting press.

The auxiliary shaft 4 has the shape of a piston 44 capable of being shifted inside a housing 6 of a safety device S for limiting the axial load of the drive worm 1. The housing 6 is mounted by means of screws 60 on the machine frame and will be provided with a bore 61 having an axis which is an extension of the axis of the drive worm 1. The bore 61 is to be closed by a first lid 7, which is secured to the housing 6 by means of screws 63 and the lid 7 is provided with an opening 74, through which a first end 4' of the shaft 4 forms a sliding fit.

As illustrated in FIG. 2, the drive worm is in a rest position so that the only axial load exerted on the drive worm originates exclusively from certain mechanical inertia components of the machine, such as the weight of the lower beam or platen Si of the cutting press. In addition, the linkage of the drive worm 1 with the toothed wheel are as such that the inertia or gravity forces create an axial load having a tendency to push the drive worm 1 in a first direction of arrow 1000, which is opposite to the side on which the toothed rim 30 is located. In order to counteract this intrinsic axial load present in the rest position, a compression spring 100 is provided in the safety device S. The spring 100 has one end seated on a second lid 8, which closes the second end of the bore 61 of the housing 6 on which it is secured by screws 81. The other end or second end of the spring 100 is seated within a cavity 92 of a reloading piston 9, which will act on the auxiliary shaft 4 to urge it in a second direction of arrow 2000, which is opposite to the first direction of arrow 1000. As illustrated, the piston 44 has a first surface 45 (FIG.3) extending substantially perpendicular to the axis of the shaft 4. The piston 44 has a second surface 42 (FIG. 4). In addition, the piston has a portion or part 40 with an outer periphery of a cylindrical configuration and a tapering left-hand portion 41. When the worm is in the rest position illustrated in FIG. 2, the reloading piston 9 contacts the first surface 45 to shift the second surface 42 against a contact or end surface 73 of the first lid 7.

When the drive worm 1 is in the operating position, so that the lower beam or platen Si of the cutting press undergoes the action of the driving force, this position is illustrated in FIG. 3. In this operating stage, the spring 100, which is rated only for counteracting the above-mentioned inertia forces, though not the operating forces, such as those produced by cutting, and the forces additionally foreseen so as to be able to counteract the axial displacement of the drive worm 1. Attention should be drawn to the fact that the linkage between the drive worm 1 and the toothed wheel R is also designed in such a way that the operating forces will call forth an axial load exerting an action in the first direction of arrow 1000 opposite to the side where the toothed rim 30 is located, i.e., toward the left, as illustrated in FIGS. 1-4. Thus, additional means are integrated into the safety device S provided with a mechanical system for holding and releasing the drive worm 1 with an automatic reloading and includes the following three essential parts:

the piston 44, which is hereafter referred to as the holding piston and is mounted on the shaft 4;

a reloading piston 9; and a housing 6, which is provided with the bore 61, which is made up of a holding chamber 64 and a reloading chamber 66.

The reloading piston 9 divides the bore 61 of the housing 6 into two fluid-tight chambers, for example the holding chamber 64 and the reloading chamber 66. The reloading piston 9 is tightly fitted with regard to the walls of the bore 61 in such a way that the oil will not be able to flow from one chamber to the other. A reloading chamber 66 is, thus, closed on one side by the second lid 8 and on the other side by the coaction of the movable reloading piston 9, which has an aperture or opening 94 in sealing contact with the end 4" of the auxiliary shaft. The holding chamber 64 is closed on one side by the movable reloadable piston 9 and on the other end by the first lid 7. The bore 61 has an internal shoulder 161 which slidably receives the peripheral wall of the piston 9. The piston also has a portion or flange part 190 which engages an enlarged portion 162 of the bore 61. Due to the coaction of the surfaces, a chamber 97 is formed and varies in size, depending on the axial position of the reloading piston 9. The variable chamber 97 is connected to the holding chamber 64 by means of a throttle made up by at least one thin groove 98 (see FIG. 4) that extends either on the periphery of the piston or can exist on the inner shoulder 161.

The holding chamber 64 is pressurized through a first orifice 65, which is connected to a pump 200 by means of a line or duct 201. With the piston 44 in contact with the end surface 73, the reloading piston 9 is then pushed to the left, as indicated by the arrow 1000 and which direction is toward the second lid 8. In order to allow the pressurized oil to act against the right-hand side of the reloading piston 9 before the latter will carry out any shift to the left, a thin groove 91 has been added to a front face of the piston.

A no-return flap or check valve 202 and a flow control 208 are arranged between the pump 200 and the orifice 65. In addition, a pressure gauge or pressostat 204 is provided.

With the holding piston 44 positioned within the chamber 64, and with pressurized fluid being applied to the chamber 64, the holding piston 44 will be shifted in the direction of arrow 2000 to shift the drive worm 1 to the right, so as to keep the pinion 10 engaged in the toothed rim 30 against any axial operating loads. In addition, the spring 100 will be compressed and, thus, enable the reloading piston 9 to be urged in the direction of arrow 1000 until its end 190 comes into contact with the second lid 8. The oil pressure build-up within the holding chamber 64 should, thus, be sufficient to move the reloading piston 9 away from the holding piston 44 and to keep the holding piston 44 engaged with the end surface 73 of the lid 7 and thereby keep the drive worm 1 in its place, notwithstanding the maximum stress of the forces occurring with the ordinary operation of the machine or press.

The chamber 66 is connected to a sump 206 of the pump 200 by an orifice 82 in the lid 8 and a line having a check valve 207. This line is also connected to the line 201 by a pressure liminator or a pressure relief valve 205.

As best illustrated in FIG. 2, the outer periphery of the portion 40 is less than the diameter of the bore 61 adjacent the lid 7 so that an annular space 300 is provided. Also, the lid 7 (FIG. 3) is provided with an outlet 71 which passes through the lid and a portion of the wall of the housing 6 and is connected to a tank 203. Finally, as illustrated in FIG. 4, the bore 61 has a reduced portion 68 immediately adjacent the portion 161 to form a step 67. As mentioned before, the left-hand portion 41 of the piston 44 has a tapered configuration.

As soon as an axial load exerted on the drive worm 1 exceeds a maximum amount admissible for the holding chamber 64 on account of one of the above-mentioned malfunctions of the press or machine, the holding piston 44 will be shifted slightly to the left in the first direction of arrow 1000 and will press a small amount of oil through the relief valve 205 and, therefore, create, between the second surface 42 of the piston 44 and the end or engagement surface 73, a free space. Oil under pressure will immediately pass through the gap 300 into this free space and, since the surface 42 has uncovered, the orifice of the outlet 71, the oil will flow out the outlet 71 into the tank 203. The outlet, for this purpose, will bring about a slight vacuum within the space still relatively narrow between the contact surface 73 and the second surface 42 so as to accelerate the penetration of oil in this space in the beginning of the holding pistons 44 shift to the left in the direction of arrow 1000. Because of the free space 300 between the radial periphery of the surface of the portion 40 of the piston 44 and the interior walls of the chamber 64, a rapid balance of the pressure working on the surface 45 and the surface 42 will occur so that the piston will be shifted in the direction of the arrow 1000 at a relatively rapid pace to uncouple the gear 10 from the ring gear 30, as illustrated in FIG. 4. As the piston 44 rapidly approaches the left-hand portion of the chamber 64, the portion 41 will enter into the reduced diameter portion 68 and start to throttle the movement of the flow of oil in a manner similar to a shock absorbing-type element.

Thus, as illustrated in FIG. 4, the pinion 10 will no longer be engaged in the toothed rim 30 of the shaft 5 when the piston 44 reaches its left-hand position in the reduced portion 68 of the chamber 64. At this moment, the overload, as might happen in a cutting press, will stop the rotation of the drive shaft 5 by means of the pneumatic brake E after the response of the device (not represented) for measuring the operating pressure between the two beams or platens Si and Ss. This notwithstanding, the flywheel Vo and the motor M will continue to rotate owing to their own inertia, though without exerting any effect on the press. At this stage, with the drive worm 1 being able to rotate freely, the lower beam or platen Si is moved by its own weight and will descent toward the lower dead center position and cause, by means of the system consisting of the crankshaft Vi and the toggle levers G, a rotation of the toothed wheel R, whereby the latter will pull the pair of chains with the gripper bars Bp backwards. In fact, in such a machine, for the purpose of synchronization, the pair of chains are usually driven by a pulley on the crankshaft Vi. In addition, the drive worm 1 and the holding piston 44 will be pushed in the direction of arrow 1000 toward the reloading piston 9. An interesting item is the fact that the lower beam or platen Si may, nonetheless, move beyond the lower dead center position after the overload, in which case it will then drop back toward the lower dead center position. This will cause the drive worm 1 to be moved by the toothed wheel R, itself required to rotate in a direction opposite to the first case envisioned to be rotated in a direction which will compel it to shift in the direction of arrow 2000, which is right and also toward the toothed rim 30.

However, this right-hand shift will occur only slowly on account of the braking action of the large mass of about 100 kg, represented by the assembly consisting of the shaft 12, the worm 1 and the coupling arrangement 11.

Consequently, considering the shifting of the assembly consisting of the drive worm 1 and the piston 4 is very fast, since the holding oil is not to be evacuated into the pipes, the control device described above will come up to the main operating condition required for the safety expected, i.e., a quickness of response to a sudden and unforeseen overload.

In the following comments, a description will show how the device is reloaded, or put back into an operating condition, after its release in the event of an overload.

Basically, the reloading is a simple process. In fact, when starting from the stage represented in FIG. 4, with the oil pressure close to zero, due to the outlet 71 being open, the shaft 4 will be shifted by the spring 100 through the piston 9. Since oil entrapped in the chamber 97 must flow through the throttling device 98, the motion will take place smoothly. The reloading piston 9 will move the holding piston 44 until the latter will touch the end surface 73 of the lid 7. In the course of this operation, the drive worm is rotated by the wheel R, which is interlocked by the weight of the beam Si. Thereupon, the toothed part 10 will engage in the toothed rim 30.

The springs 31 allow a slight shift of the toothed rim 30 in the direction indicated by arrow 2000 and have, moreover, the function of facilitating the required angular positioning of the toothed part 10 with regard to the toothed rim 30. When the toothed part 10 has fully penetrated into the hollow toothed rim 30, the drive worm 1 is, again, in a position shown in FIG. 2. At this stage, the outlet 71 will be closed by the surface 42 so that the oil pressure in the holding chamber 64 will, again, be built up. As already described above, the drive worm 1, acting jointly with its safety control, will be conditioned for the process shown by FIG. 3, with the oil pressure having also pushed the piston 9 against the lid 8.

In the most frequent case with the lower beam Si dropping to the lower dead center position and remaining interlocked in the dead center position, the drive worm 1 is continuously held under pressure directed toward the holding piston 44. The oil flow from the pump 200 may continue and be evacuated through the outlet 71 of the housing 6. The drive worm 1 is then pushed back by the reloading piston 9, which is moved by the spring 100 in the direction of arrow 2000. In the course of this shift, the drive worm 1 rotates, due to the action of the toothed part on the wheel R. This shift also takes place slowly, since it undergoes the slowing action of the oil which is to flow through the throttle made by the right-hand part 40 of the piston and the walls 68 of the reduced section of the chamber 64, as described above. As long as the drive worm 1 has not reached a position enabling the pinion 10 to be fully engaged in the toothed rim 30, the oil pressure in the housing 6 is unable to increase. When the drive worm 1 has reached its required position, the outlet 71 will be closed by the surface 42 and the oil pressure will then raise and the reloading piston 9 will then be pushed back to the left-hand side, toward its waiting position, with the spring 100 being compressed. An electric pressure monitor (not represented) will then emit the order to slow the drive shaft 5 again. At this stage, and of course provided the gripper bar chain pair has not been displaced as a result of the overload situation, the main motor M driving the flywheel Vo can be started up and the machine clutched in. After an overload situation, the operation involved with the reloading of the safety device as described will need only approximately 5 to 10 seconds.

Although various minor modifications may be suggested by those versed in the art, it should be understood that I wish to embody within the scope of the patent granted hereon all such modifications as reasonably and properly come within the scope of my contribution to the art.

I claim:

1. In a safety device for limiting the axial operating loading forces exerted on a drive worm of a machine, said drive worm being mounted on a rotary main shaft having one end which is provided with connecting means for forming an axially detachable connection with a drive shaft, said main shaft having coupling means for connecting a second end of the main shaft to a non-rotary auxiliary shaft that is connected to a safety device, said safety device allowing axial shifting of the drive worm in a first direction in response to an axial overload so as to disconnect the connecting means to free the main shaft from the drive shaft, the improvements comprising the safety device having a housing containing a holding chamber provided with at least an engagement surface adjacent one end and a pressurized oil inlet of a pressurized line spaced from the engagement surface, a holding piston being provided on the auxiliary shaft and disposed in said holding chamber, said holding piston having a first surface and a second surface, means for introducing a pressurized oil through said pressurized line and oil inlet to act on the first surface of the piston to urge the piston in a second direction to exert a force opposite to the first direction and the axial loading until the second surface of the piston contacts said engagement surface of said chamber to limit the shift of the drive worm in said second direction, a passage being provided for a free flow of oil contained within the chamber between the first surface and the second surface of the piston, and relief means being connected to the pressurized line for enabling a slight discharge of oil from the chamber in response to an overpressure applied to the oil in said chamber so as to enable a shifting of the piston in the first direction away from the engagement surface so that pressure is applied on both said first and second surfaces to eliminate the holding force and enable the disengaging of said connecting means.

2. In a safety device according to claim 1, wherein said chamber has an orifice connected to a pressurized oil return line, said orifice being positioned to be closed by the piston when the piston has the second surface in contact with the engagement surface so that shifting of the piston from contact with the engagement surface causes the orifice to be opened to enable a draining of a space formed between the second surface and the engagement surface to accelerate the penetration of oil into said space during the initial phase of the actuation of said safety device.

3. In a safety device according to claim 2, which includes a second piston having means to shift the auxiliary shaft and, thereby, the worm drive, in the second direction.

4. In a safety device according to claim 3, wherein the means to shift includes a spring to urge the second piston against the holding piston and to shift the holding piston to a position with the second surface contacting the engagement surface of the chamber when the drive worm is in a rest position and the holding chamber is not under pressure.

5. In a safety device according to claim 4, wherein the holding chamber is formed by a bore having an axis aligned with an axis of the drive worm, the bore being closed at a first end by a first lid having an opening sealingly receiving the auxiliary shaft and allowing sliding movement thereof, said bore containing a portion forming a reloading chamber serving as a seat for the spring of the second piston, said reloading chamber being closed by a second lid on which said spring engages, and said means for introducing pressurized oil will shift the second piston away from the holding piston and compress the spring.

6. In a safety device according to claim 5, wherein the passage consists of an annular space between the interior of the bore forming the holding chamber and the peripheral surface of the holding piston.

7. In a safety device according to claim 5, wherein the second piston has a hollow structure receiving at least a part of said spring.

8. In a safety device according to claim 7, wherein the auxiliary shaft is provided with an extension extending beyond said holding piston, said second piston being provided with an aperture receiving said extension with a fluid-tight sliding fit allowing movement of the extension axially relative to said second piston.

9. In a safety device according to claim 7, wherein the second piston, on a surface facing the first surface of the holding piston, has a small passage enabling easy pressurization of the oil in said holding chamber to urge the second piston out of engagement with the first surface of the holding piston.

10. In a safety device according to claim 5, wherein the walls of the holding chamber and the periphery of the holding piston, at a point spaced inward from the engagement surface, form hydraulic throttle means for reducing the lengthwise shifting speed of the drive worm during the disengaging of the connecting means.

11. In a safety device according to claim 10, wherein the holding piston has a first part with a cylindrical radial periphery extending parallel to the walls of the holding chamber and a second part with a tapered shape extending from the diameter of the first part toward a smaller diameter and said bore having a portion with a reduced diameter coacting with the tapering portion to form said hydraulic throttle means.

12. In a safety device according to claim 1, wherein the connecting means of the first end of the main shaft with the drive shaft is achieved by means of a pinion fitted on the end of said first end engageable with inner teeth of a rim, which is keyed in a bore for slidable movement between a first and second position and includes spring means for biasing the rim to said first position.

13. In a safety device according to claim 1, wherein the coupling means between the second end of the main shaft and the end of the auxiliary shaft includes a lengthwise shiftable support having at least one rotary bearing for the second end of the main shaft and means for lengthwise and rotatably fastening of said second end to said one end of the auxiliary shaft with regard to the support.

14. In a safety device according to claim 1, wherein the means for introducing pressurized oil includes a pump connected to said pressurized line, said pressurize line having a check valve arranged to prevent backflow from the chamber into the pump, said pressurized line between the oil inlet and check valve having a flow control device, a pressostat, and a pressure relief valve which forms said relief means.

* * * * *